(12) United States Patent
Takahashi et al.

(10) Patent No.: US 10,785,755 B2
(45) Date of Patent: Sep. 22, 2020

(54) USER EQUIPMENT, BASE STATION, AND COMMUNICATION METHOD

(71) Applicant: NTT DOCOMO, INC., Tokyo (JP)

(72) Inventors: Hideaki Takahashi, Tokyo (JP); Tooru Uchino, Tokyo (JP); Kohei Kiyoshima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 6 days.

(21) Appl. No.: 16/077,069

(22) PCT Filed: Jan. 11, 2017

(86) PCT No.: PCT/JP2017/000561
§ 371 (c)(1),
(2) Date: Aug. 10, 2018

(87) PCT Pub. No.: WO2017/141574
PCT Pub. Date: Aug. 24, 2017

(65) Prior Publication Data
US 2019/0053221 A1     Feb. 14, 2019

(30) Foreign Application Priority Data
Feb. 15, 2016   (JP) ................................. 2016-026393

(51) Int. Cl.
*H04W 72/04*     (2009.01)
*H04W 8/22*      (2009.01)
(Continued)

(52) U.S. Cl.
CPC ....... *H04W 72/0413* (2013.01); *H04L 1/0003* (2013.01); *H04W 8/22* (2013.01);
(Continued)

(58) Field of Classification Search
None
See application file for complete search history.

(56) References Cited

U.S. PATENT DOCUMENTS

2011/0319069 A1* 12/2011 Li ........................ H04W 8/22
455/422.1
2012/0087396 A1* 4/2012 Nimbalker ........ H04W 72/1252
375/219
(Continued)

FOREIGN PATENT DOCUMENTS

EP     2542007 A1     1/2013

OTHER PUBLICATIONS

International Search Report issued in PCT/JP2017/000561 dated Mar. 21, 2017 (5 pages).
(Continued)

*Primary Examiner* — Chi H Pham
*Assistant Examiner* — Vladislav Y Agureyev
(74) *Attorney, Agent, or Firm* — Osha Liang LLP

(57) ABSTRACT

There is provided user equipment of a radio communication system provided with a base station and the user equipment, the user equipment including a reporting unit that reports, to the base station, a band combination supported by the user equipment, a MIMO layer number, and a modulation scheme, and a UE category supported by the user equipment; and a receiver that receives, upon detecting that a maximum bit rate that is achievable by carrier aggregation performed with the band combination supported by the user equipment, the MIMO layer number, and the modulation scheme exceeds a maximum bit rate to be supported by the UE category supported by the user equipment, data from the base station with a bit rate that is less than or equal to the maximum bit rate to be supported by the user equipment under the UE category.

3 Claims, 7 Drawing Sheets

(51) Int. Cl.
*H04W 72/12* (2009.01)
*H04L 1/00* (2006.01)
*H04W 8/24* (2009.01)
*H04W 28/06* (2009.01)
*H04B 7/0413* (2017.01)

(52) U.S. Cl.
CPC ............ *H04W 8/24* (2013.01); *H04W 28/06* (2013.01); *H04W 72/04* (2013.01); *H04W 72/0453* (2013.01); *H04W 72/12* (2013.01); *H04B 7/0413* (2013.01)

(56) References Cited

U.S. PATENT DOCUMENTS

| | | | | |
|---|---|---|---|---|
| 2012/0207130 | A1* | 8/2012 | Jang | H04W 8/24 370/331 |
| 2012/0322455 | A1 | 12/2012 | Oh | |
| 2014/0146697 | A1* | 5/2014 | Kim | H04B 7/0413 370/252 |
| 2015/0215987 | A1* | 7/2015 | Kim | H04L 1/1848 370/329 |
| 2015/0296503 | A1* | 10/2015 | Larsson | H04L 1/1819 370/329 |
| 2015/0334653 | A1* | 11/2015 | Ang | H04W 52/0229 370/311 |
| 2016/0037488 | A1* | 2/2016 | Li | H04W 76/14 370/329 |
| 2016/0119778 | A1* | 4/2016 | Uchino | H04W 8/24 455/422.1 |
| 2016/0157228 | A1* | 6/2016 | Yum | H04W 76/27 370/329 |
| 2016/0270055 | A1* | 9/2016 | Larsson | H04L 1/0003 |
| 2016/0302182 | A1* | 10/2016 | Nogami | H04L 5/0044 |
| 2017/0055264 | A1* | 2/2017 | Seo | H04W 72/12 |
| 2017/0086183 | A1* | 3/2017 | Yi | H04L 5/0053 |
| 2017/0118792 | A1* | 4/2017 | Rico Alvarino | H04W 52/0225 |
| 2017/0230780 | A1* | 8/2017 | Chincholi | H04W 4/70 |
| 2018/0041857 | A1* | 2/2018 | Ouchi | H04W 8/24 |
| 2018/0070250 | A1* | 3/2018 | Venkataraman | H04W 72/1247 |
| 2018/0309551 | A1* | 10/2018 | Baldemair | H04L 5/0039 |
| 2019/0223204 | A1* | 7/2019 | Kim | H04W 72/14 |
| 2019/0297662 | A1* | 9/2019 | Palat | H04W 76/27 |
| 2019/0357199 | A1* | 11/2019 | Ali | H04W 48/16 |

OTHER PUBLICATIONS

Written Opinion of the International Searching Authority issued in PCT/JP2017/000561 dated Mar. 21, 2017 (5 pages).
3GPP TS 36.306 V13.0.0; "3rd Generation Partnership Project; Technical Specification Group Radio Access Network; Evolved Universal Terrestrial Radio Access (E-UTRA); User Equipment (UE) radio access capabilities (Release 13)"; Dec. 2015 (48 pages).
3GPP TS 36.331 V13.0.0; "3rd Generation Partnership Project; Technical Specification Group Radio Access Network; Evolved Universal Terrestrial Radio Access (E-UTRA); Radio Resource Control (RRC); Protocol specification (Release 13)"; Dec. 2015 (507 pages).
Japanese Office Action in corresponding Application No. 2016-026393 dated Mar. 21, 2017 (9 pages).
Extended European Search Report issued in counterpart European Patent Application No. 17752838.7, dated Dec. 13, 2018 (10 Pages).

* cited by examiner

FIG.1

Table 4.1A-1: Downlink physical layer parameter values set by the field *ue-CategoryDL*

| UE DL Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| DL Category 15 | 749856-798800 (Note 3) | 149776 (4 layers, 64QAM)<br>195816 (4 layers, 256QAM)<br>75376 (2 layers, 64QAM)<br>97896 (2 layers, 256QAM) | 9744384 | 2 or 4 |
| DL Category 16 | 978960 -1051360 (Note 3) | 149776 (4 layers, 64QAM)<br>195816 (4 layers, 256QAM)<br>75376 (2 layers, 64QAM)<br>97896 (2 layers, 256QAM) | 12789504 | 2 or 4 |
| NOTE 1: | In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation. | | | |
| NOTE 2: | Within one TTI, a UE indicating category 0 shall be able to receive up to 1000 bits for a transport block associated with C-RNTI/Semi-Persistent Scheduling C-RNTI/P-RNTI/SI-RNTI/RA-RNTI and up to 2216 bits for another transport block associated with P-RNTI/SI-RNTI/RA-RNTI. | | | |
| NOTE 3: | The UE indicating category x shall reach the value within the defined range indicated by "Maximum number of DL-SCH transport block bits received within a TTI" of category x. The UE shall determine the required value within the defined range indicated by "Maximum number of DL-SCH transport block bits received within a TTI" of the corresponding category, based on its capabilities (i.e. CA band combination, MIMO, Modulation scheme). | | | |

| CA PATTERN | | DL MAXIMUM BIT RATE(1TTI) |
|---|---|---|
| A | 5CC<br>・2x2MIMO, 64QAM | 753760 |
| B | 5CC<br>・2CC: 2x2MIMO, 256QAM<br>・3CC: 2x2MIMO, 64QAM | 843840 |
| C | 5CC<br>・1CC: 2x2MIMO, 64QAM<br>・2CC: 2x2MIMO, 256QAM<br>・1CC: 4x4MIMO, 64QAM | 841888 |

FIG.9

4.1A  ue-CategoryDL and ue-CategoryUL

The fields *ue-CategoryDL* and *ue-CategoryUL* define downlink/uplink capability respectively. The parameters set by the UE DL/UL Categories are defined in subclause 4.2. Tables 4.1A-1 and 4.1A-2 define the downlink and, respectively, uplink physical layer parameter values for each UE DL/UL Category Table 4.1A-4 defines the minimum capability for the maximum number of bits of a MCH transport block received within a TTI for an MBMS capable UE. Table 4.1A-6 defines the only combinations for UE UL and DL Categories that are allowed to be signalled with *ue-CategoryDL* and *ue-CategoryUL*. Table 4.1A-6 also defines which UE Categories a UE shall indicate in addition to the combinations for UE UL and DL Categories.

**Table 4.1A-1: Downlink physical layer parameter values set by the field *ue-CategoryDL***

| UE DL Category | Maximum number of DL-SCH transport block bits received within a TTI (Note 1) | Maximum number of bits of a DL-SCH transport block received within a TTI | Total number of soft channel bits | Maximum number of supported layers for spatial multiplexing in DL |
|---|---|---|---|---|
| DL Category 0 (Note 2) | 1000 | 1000 | 25344 | 1 |
| DL Category 6 | 301504 | 149776 (4 layers, 64QAM) 75376 (2 layers, 64QAM) | 3654144 | 2 or 4 |
| DL Category 7 | 301504 | 149776 (4 layers, 64QAM) 75376 (2 layers, 64QAM) | 3654144 | 2 or 4 |
| DL Category 9 | 452256 | 149776 (4 layers, 64QAM) 75376 (2 layers, 64QAM) | 5481216 | 2 or 4 |
| DL Category 10 | 452256 | 149776 (4 layers, 64QAM) 75376 (2 layers, 64QAM) | 5481216 | 2 or 4 |
| DL Category 11 | 603008 | 149776 (4 layers, 64QAM) 195816 (4 layers, 256QAM) 75376 (2 layers, 64QAM) 97896 (2 layers, 256QAM) | 7308288 | 2 or 4 |
| DL Category 12 | 603008 | 149776 (4 layers, 64QAM) 195816 (4 layers, 256QAM) 75376 (2 layers, 64QAM) 97896 (2 layers, 256QAM) | 7308288 | 2 or 4 |
| DL Category 13 | 391632 | 195816 (4 layers, 256QAM) 97896 (2 layers, 256QAM) | 3654144 | 2 or 4 |
| DL Category 14 | 3916560 | 391656 (8 layers, 256QAM) | 47431680 | 8 |
| DL Category 15 | 749856-798800 (Note 3) | 149776 (4 layers, 64QAM) 195816 (4 layers, 256QAM) 75376 (2 layers, 64QAM) 97896 (2 layers, 256QAM) | 9744384 | 2 or 4 |
| DL Category 16 | 978960 -1051360 (Note 3) | 149776 (4 layers, 64QAM) 195816 (4 layers, 256QAM) 75376 (2 layers, 64QAM) 97896 (2 layers, 256QAM) | 12789504 | 2 or 4 |

NOTE 1: In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.

NOTE 2: Within one TTI, a UE indicating category 0 shall be able to receive up to 1000 bits for a transport block associated with C-RNTI/Semi-Persistent Scheduling C-RNTI/P-RNTI/SI-RNTI/RA-RNTI and up to 2216 bits for another transport block associated with P-RNTI/SI-RNTI/RA-RNTI.

NOTE 3: The UE indicating category x shall reach the value within the defined range indicated by "Maximum number of DL-SCH transport block bits received within a TTI" of category x. The UE shall determine the required value within the defined range indicated by "Maximum number of DL-SCH transport block bits received within a TTI" of the corresponding category, based on its capabilities (i.e. CA band combination, MIMO, Modulation scheme). If the CA band combination, MIMO and modulation scheme supported by the UE exceeds the upper limit of the defined range, the UE shall support the maximum value of the defined range indicated by "Maximum number of DL-SCH transport block bits received within a TTI" of the corresponding category.

USER EQUIPMENT, BASE STATION, AND COMMUNICATION METHOD

TECHNICAL FIELD

The present invention relates to user equipment, a base station, and a communication method.

BACKGROUND ART

In the UMTS (Universal Mobile Telecommunications System) network, Long Term Evolution (LTE: Long Term Evolution) has been specified to achieve a higher data rate, lower latency, and so forth (Non-Patent Document 1). Furthermore, to achieve a wider band and higher speed compared to those of LTE, a successor system of LTE (which is also referred to as LTE-A (LTE-Advanced), FRA (Future Radio Access), 4G, 5G, and so forth, for example) has been studied.

Units of user equipment in LTE are classified into a plurality of categories depending on terminal capabilities. The category is referred to as the "UE category," and, for example, category 6 user equipment specified in 3GPP Release 10 supports 300 Mbps and 51 Mbps, as the DL (Downlink) maximum bit rate (peak rate) and the UL (Uplink) maximum bit rate, respectively. Furthermore, on and after Release 12, the UE categories are specified while being separated into DL and UL. The UE category for DL is referred to as the "UE DL category," and the UE category for UL is referred to as the "UE UL category" (Non-Patent 1). It is specified that the user equipment UE reports, for example, during connection to a network, the UE category supported by the device itself to a base station with a predetermined signaling message (UE-EUTRA-Capability).

Furthermore, in LTE-Advanced, in order to achieve a throughput that exceeds that of LTE while maintaining the backward compatibility with LTE, carrier aggregation (CA: Carrier Aggregation) has been adopted with which communication is performed by simultaneously using a plurality of carriers while using the bandwidth (up to 20 MHz) supported by LTE as a basic unit. A carrier that can be a basic unit in carrier aggregation is referred to as a component carrier (CC: Component Carrier).

Similar to the above-described UE category, it is specified that user equipment that supports CA reports its own CA capability to the base station eNB with a predetermined signaling message (UE-EUTRA-Capability). More specifically, in the report of the CA capability, the user equipment UE reports, to the base station, combinations of bands supported by the device itself during CA (band combination, BandCombination), and the user equipment UE reports, to the base station, a number of supported MIMO layers, supported modulation method, etc., for each band combination and for each band, individually for UL/DL.

PRIOR ART DOCUMENT

Non-Patent Document

Non-Patent Document 1: 3GPP TS36.306 V13.0.0(2015-12)
Non-Patent Document 2: 3GPP TS36.331 V13.0.0(2015-12)

SUMMARY OF INVENTION

Problem to be Solved by the Invention

There is a need for a technique for allowing user equipment supporting a specific UE category to properly perform communication within the range of the capability of the user equipment.

Means for Solving the Problem

According to an aspect of the present invention, there is provided user equipment of a radio communication system provided with a base station and the user equipment, the user equipment including a reporting unit that reports, to the base station, a band combination supported by the user equipment, a MIMO layer number, and a modulation scheme, and a UE category supported by the user equipment; and a receiver that receives, upon detecting that a maximum bit rate that is achievable by carrier aggregation performed with the band combination supported by the user equipment, the MIMO layer number, and the modulation scheme exceeds a maximum bit rate to be supported for the UE category supported by the user equipment, data from the base station with a bit rate that is less than or equal to the maximum bit rate to be supported by the user equipment under the UE category.

Advantage of the Invention

According to the disclosed technology, there is provided a technique for allowing user equipment supporting a specific UE category to properly perform communication within the range of the capability of the user equipment.

BRIEF DESCRIPTION OF DRAWINGS

FIG. 1 is a diagram showing 3GPP requirements for respective UE DL categories;

FIG. 9 is a diagram showing an example of a change of a standard specification.

EMBODIMENTS OF THE INVENTION

FIG. 1 shows the values specified in Non-Patent Document 1 as the receiving capability to be supported by the user equipment for each UE DL category. As specified in "Maximum number of DL-SCH transport block bits received within a TTI" of FIG. 1, it is specified that the category 15 user equipment is to support from 749856 bits to 798800 bits, as the maximum bit rate that can be received in 1 TTI (1 ms) on DL-SCH (Downlink-Shared Channel). Similarly, it is specified that the category 16 user equipment is to support from 978960 bits to 1051360 bits, as the maximum bit rate that can be received in 1 TTI (1 ms) on DL-SCH. Note that the numerical values specified in FIG. 1 represent the maximum bit rate per 1 ms, so that, by multiplying the numbers shown in FIG. 1 by 1000, they can be converted into the maximum bit rates per second. Namely, the DL maximum bit rate to be supported by the category 15 user equipment is approximately 800 Mbps; and the DL maximum bit rate to be supported by the category 16 user equipment is approximately 1 Gbps.

The maximum bit rates to be supported by the category 15 user equipment and the category 16 user equipment are defined with respective ranges, instead of fixed numbers. The reason is that, even if the units of user equipment belong to the same category, the supported band combinations (combinations of the CA bands), the MIMO layer number, and the capabilities of the modulation method may not be the same. Thus, the maximum bit rate that can be supported may differ depending on user equipment.

Figures 2, 3:
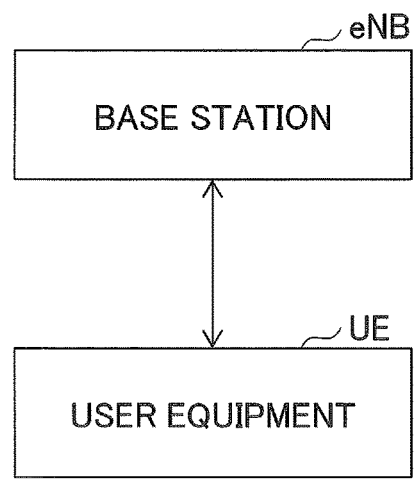
FIG. 2 is a diagram showing maximum bit rates in CA.
FIG. 3 is a diagram illustrating an example of a configuration of a radio communication system according to an embodiment.

Here, depending on a combination of the CCs in the carrier aggregation, the maximum peak rate may exceed the maximum peak rate shown in FIG. 1. FIG. 2 is a table obtained by calculating, for each of the combinations of the CCs, the DL maximum bit rate per 1 TTI using the maximum bit rates described in "Maximum number of bits of a DL-SCH transport block received within a TTI" of FIG. 1. For example, the CA pattern A shown in FIG. 2 indicates a combination of 5 CCs such that, for each CC, 2×2 MIMO and 64 QAM are applied. From "Maximum number of bits of a DL-SCH transport block received within a TTI" of FIG. 1, the maximum bit rate for the two layers (2×2 MIMO) and 64 QAM is 75376 bits, so that the maximum bit rate for the CA pattern A, in which 5 CCs are combined, can be calculated to be 75376×5 (5 CCs)×2 (in LTE, up to 2 TBs can be transmitted per 1 TTI)=753760 bits. If the maximum bit rates are calculated by the same method for the CA patterns B and C, they are 843840 bits and 841888 bits, respectively. Namely, for each of the CA patterns B and C, the maximum bit rate exceeds the maximum bit rate to be supported by the category 15 user equipment, which is specified in the "Maximum number of DL-SCH transport block bits received within a TTI" of FIG. 1. The same problem may occur for the category 16 user equipment.

The current 3GPP requirement does not specify, for performing carrier aggregation, such as that of the CA patterns B and C, as to whether the requirement for the UE category (i.e., the values specified in FIG. 1) is to be applied, or wheather the maximum bit rate for the combination of the CCs corresponding to the CA capability of the user equipment is to be applied, as the maximum bit rate to be supported by the user equipment. When DL scheduling is to be performed, if the base station eNB performs scheduling with a bit rate that exceeds the capability of the user equipment, the DL data may not be received at the user equipment side, and, as a result, retransmission may be repeated, and thereby the DL throughput may be deteriorated.

An embodiment of the present invention is described below by referring to the drawings. Note that the embodiment described below is merely an example; and embodiments to which the present invention is applied are not limited to the below-described embodiment. For example, it is assumed that the radio communication system according to the embodiment is a system based on a scheme conforming to LTE; however, the present invention is not limited to LTE, and can be applied to another scheme. Note that, in the present specification and the claims, "LTE" is used in a broad meaning including, not only a communication scheme corresponding to release 8 or 9 of 3GPP, but also release 10, 11, 12, 13, or on or after release 14, which correspond to the fifth generation communication scheme, of 3GPP.

Furthermore, the following embodiment is described while mainly targeted for the UE category 15 or 16; however it is not limited to these. In the future, it can also be applied to a new UE category, which is specified so that the maximum bit rate to be supported by the user equipment has a range, instead of a fixed value.

<System Configuration>

FIG. 3 is a diagram illustrating an example of a configuration of a radio communication system according to the embodiment. As illustrated in FIG. 3, the radio communication system according to the embodiment includes a base station eNB and user equipment UE. The user equipment UE and the base station eNB are capable of performing CA. In FIG. 3, one user equipment UE and one base station eNB are illustrated; however, this is an example, and each of these may be more than one. Furthermore, the user equipment UE may be provided with a capability for simultaneously performing communication with a plurality of base stations (Dual Connectivity).

<Functional Configuration>

Next, functional configurations of the user equipment UE and the base station eNB according to the embodiment are described.

(Base Station)

Figure 4:
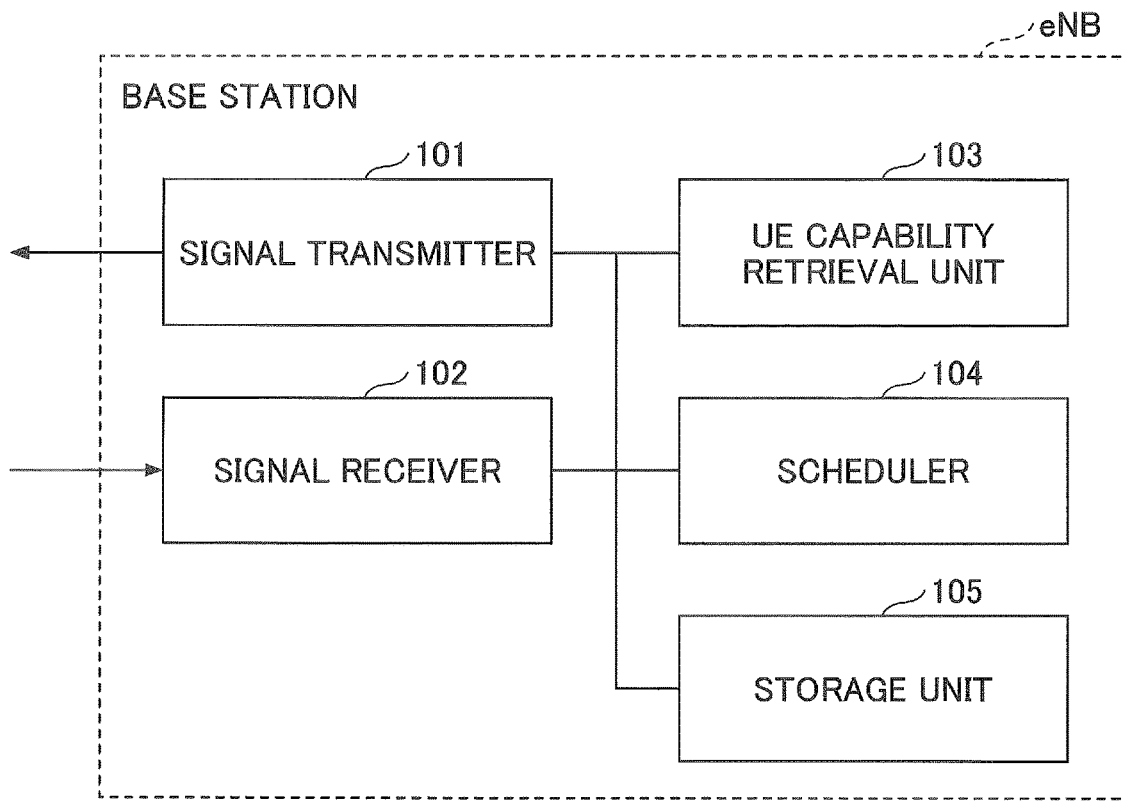
FIG. 4 is a diagram illustrating an example of a functional configuration of a base station according to the embodiment.

FIG. 4 is a diagram illustrating an example of a functional configuration of the base station according to the embodiment. As illustrated in FIG. 4, the base station eNB includes a signal transmitter 101; a signal receiver 102; a UE capability retrieval unit 103; a scheduler 104; and a storage unit 105. FIG. 4 only shows, in the base station eNB, the main functional units, and it includes, at least, a function, which is not depicted, for performing an operation conforming to the LTE. Furthermore, the functional configuration depicted in FIG. 4 is merely an example. The functional division and the names of the functional units may be any division and names, provided that the operation according to the embodiment can be performed. The base station eNB may be a single eNB; or, depending on a configuration (Configuration), it can be any of a MeNB and a SeNB for performing DC.

The signal transmitter 101 is provided with a function for generating various types of physical layer signals from higher layer signals to be transmitted from the base station eNB, and for wirelessly transmitting them. The signal receiver 102 is provided with a function for wirelessly receiving various types of signals from the user equipment UE, and for retrieving higher layer signals from the received physical layer signals. Each of the signal transmitter 101 and the signal receiver 102 is provided with a function for performing CA with which communication is performed by bundling a plurality of CCs. Furthermore, the signal transmitter 101 and the signal receiver 102 may include a radio communication unit remotely installed from the main body (controller) of the base station eNB, such as a RRH (Remote Radio Head).

Each of the signal transmitter 101 and the signal receiver 102 is provided with a packet buffer, and it is assumed that processes of the layer 1 (PHY), the layer 2 (MAC, RLC, PDCP), and the layer 3 (RRC) are to be performed. However, the processes are not limited to these.

The UE capability retrieval unit 103 includes a function for retrieving UE capability (UE-EUTRA-Capability) reported from the user equipment UE, and for storing it in a memory, etc.

The scheduler 104 includes a function for performing a scheduling process for allocating a radio resource to the user equipment UE.

The storage unit 105 stores, for each UE category of the user equipment UE, a maximum bit rate to be supported by the user equipment UE. For example, the table shown in FIG. 9, which is described below, may be stored.

(User Equipment)

Figure 5:
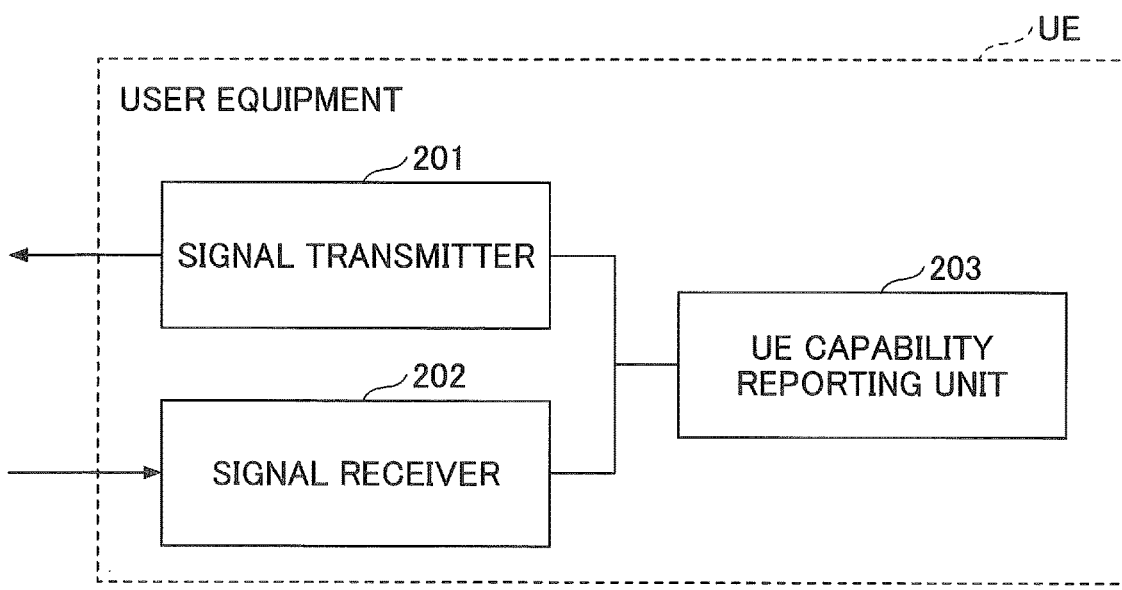
FIG. 5 is a diagram illustrating an example of a functional configuration of user equipment according to the embodiment.

FIG. 5 is a diagram illustrating an example of a functional configuration of the user equipment according to the embodiment. As illustrated in FIG. 5, the user equipment UE includes a signal transmitter 201; a signal receiver 202; and a UE capability reporting unit 203. FIG. 5 only shows, in the user equipment UE, the functional units that are particularly related to the embodiment of the present invention, and it includes, at least, a function, which is not depicted, for performing an operation conforming to the LTE. Furthermore, the functional configuration depicted in FIG. 5 is merely an example. The functional division and the names of the functional units may be any division and names, provided that the operation according to the embodiment can be performed.

The signal transmitter 201 includes a function for generating various types of physical layer signals from upper layer signals to be transmitted from the user equipment UE, and for wirelessly transmitting them. The signal receiver 202 includes a function for wirelessly receiving various types of signals from the base station eNB, and for retrieving higher layer signals from the received physical layer signals. Each of the signal transmitter 201 and the signal receiver 202 includes a function for performing CA with which communication is performed by bundling a plurality of CCs.

Each of the signal transmitter 201 and the signal receiver 202 is provided with a packet buffer, and it is assumed that the processes of the layer 1 (PHY), the layer 2 (MAC, RLC, PDCP), and the layer 3 (RRC) are to be performed. However, the processes are not limited to these.

Furthermore, the signal receiver 202 is provided with a capability of receiving, upon detecting that a maximum bit rate that is achievable by carrier aggregation that is performed with a band combination (a combination of CCs), a MIMO layer number, and a modulation scheme that are supported by the user equipment UE itself exceeds a maximum bit rate specified in the standard specification as a maximum bit rate to be supported by the UE category supported by itself, at the maximum bit rate specified in the standard specification. Namely, the signal receiver 202 is capable of receiving data from the base station eNB with a bit rate that is less than or equal to the maximum bit rate to be supported by the user equipment UE under the UE category.

Furthermore, the signal receiver 202 is provided with a capability of receiving, upon detecting that a maximum bit rate that is achievable by carrier aggregation that is performed with a band combination (a combination of CCs), a MIMO layer number, and a modulation scheme that are supported by the user equipment UE itself exceeds an upper limit of a maximum bit rate with a predetermined range that is specified by the standard specification as the maximum bit rate to be supported by the UE category supported by itself, at the upper limit of the maximum bit rate with the predetermined range specified by the standard specification (the largest bit rate of maximum bit rates within the predetermined range specified by the standard specification). Namely, the signal receiver 202 is capable of receiving data from the base station eNB with a bit rate that is less than or equal to the upper limit of the maximum bit rate with the predetermined range to be supported by the user equipment UE under the UE category.

The UE capability reporting unit 203 is provided with a function for reporting its own UE capability (UE-EUTRA-Capability) to the base station eNB.

Each of the above-described functional configurations of the user equipment UE and the base station eNB may be entirely implemented by a hardware circuit (e.g., one or more IC chips); or a part of it may be formed of a hardware circuit, and the other part may be implemented by a CPU and a program.

(Base Station)

Figure 6:
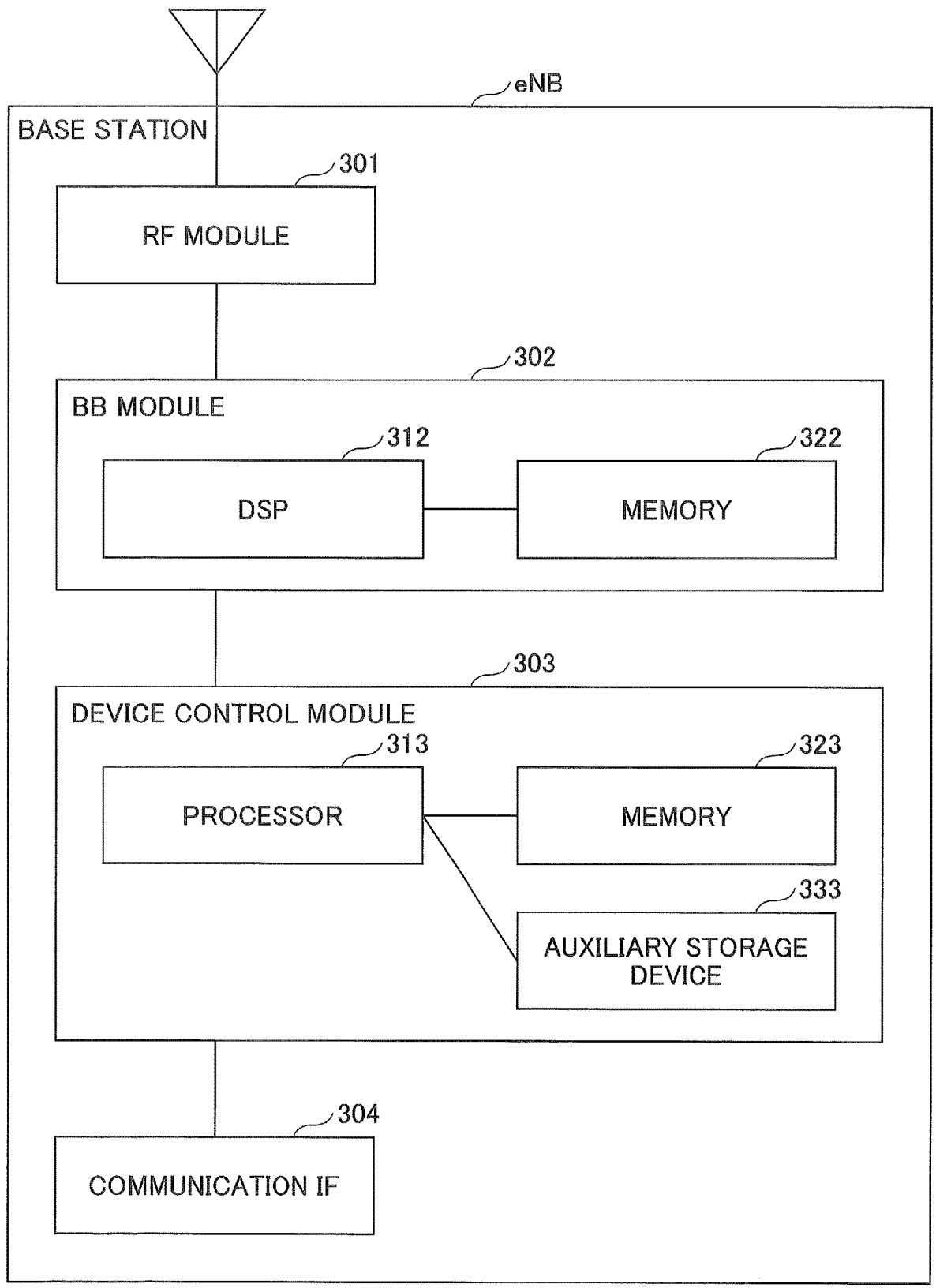
FIG. 6 is a diagram illustrating an example of a hardware configuration of the base station according to the embodiment.

FIG. 6 is a diagram illustrating an example of a hardware configuration of the base station according to the embodiment. FIG. 6 shows a configuration closer to an implementation example compared to FIG. 4. As illustrated in FIG. 6, the base station eNB includes a RF (Radio Frequency) module 301 that executes a process related to a radio signal; a BB (Base Band) processing module 302 that performs baseband signal processing; a device control module 303 that performs a process of a higher layer, etc.; and a communication IF 304 that is an interface for connecting to a network.

The RF module 301 generates a radio signal to be transmitted from an antenna by applying a D/A (Digital-to-Analog) conversion; modulation; a frequency conversion; power amplification, and so forth to a digital baseband signal received from the BB processing module 302. Additionally, a digital baseband signal is generated by applying a frequency conversion, an A/D (Analog to Digital) conversion, demodulation, and so forth to a received radio signal; and it is passed to the BB processing module 302. The RF module 301 includes, for example, a part of the signal transmitter 101 and a part of the signal receiver 102, which are illustrated in FIG. 4.

The BB processing module 302 executes a process of mutually converting an IP packet and a digital baseband signal. A DSP (Digital Signal Processor) 312 is a processor that executes signal processing in the BB processing module 302. A memory 322 is used as a work area of the DSP 312. The BB processing module 302 includes, for example, a part of the signal transmitter 101, and a part of the signal receiver 102, which are illustrated in FIG. 4.

The device control module 303 executes protocol processing of an IP layer, OAM (Operation and Maintenance) processing, etc. A processor 313 is the processor that executes a process to be executed by the device control module 303. A memory 323 is used as a work area of the processor 313. The auxiliary storage device 333 is, for example, a HDD, etc., and stores various types of setting information items, etc., for the base station eNB itself to operate. The device control module 303 includes, for example, a part of the signal transmitter 101, a part of the signal receiver 102, the UE capability retrieval unit 103, and the storage unit 105, which are illustrated in FIG. 4.

(User Equipment)

Figure 7:
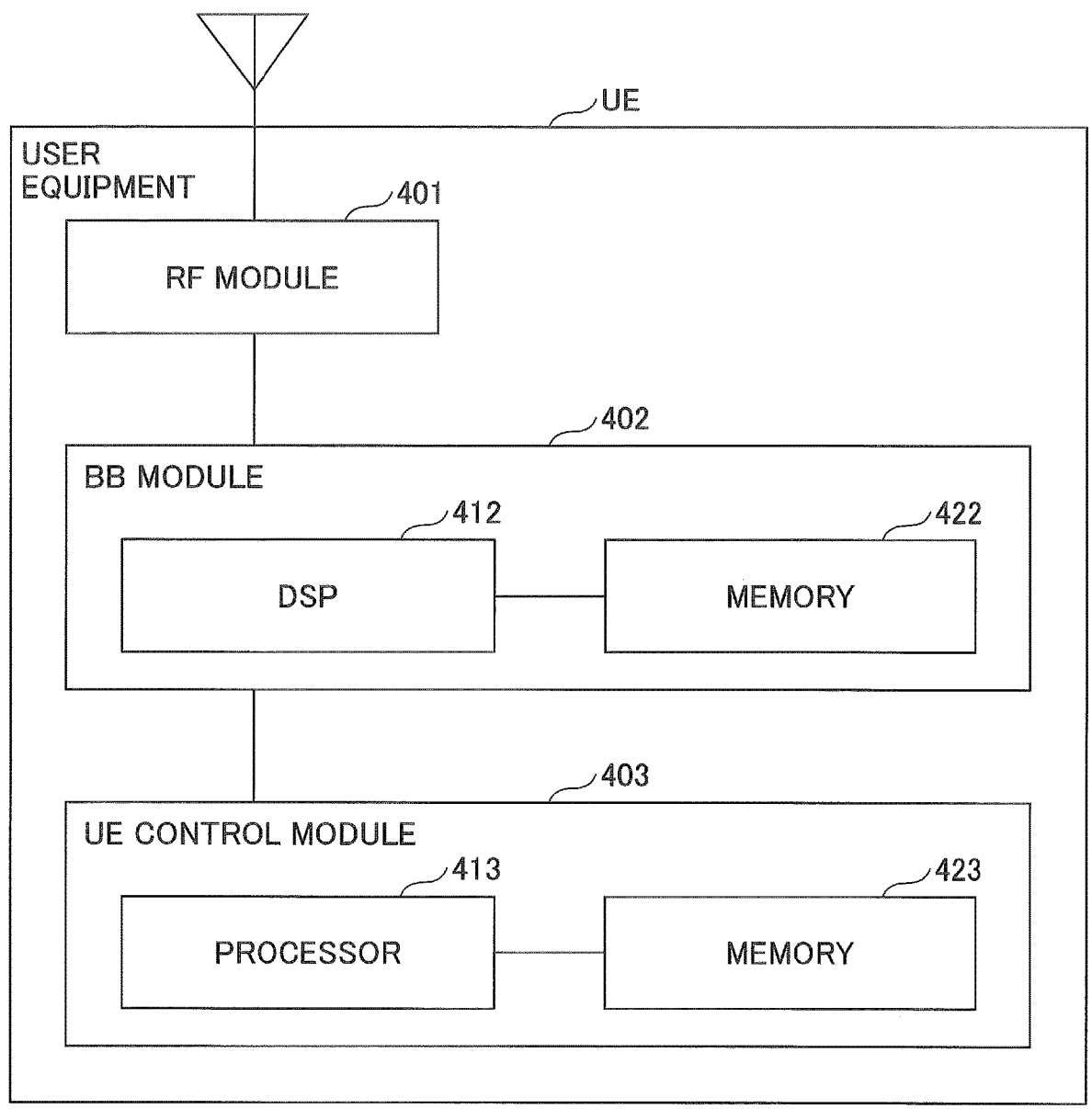
FIG. 7 is a diagram illustrating an example of a hardware configuration of the user equipment according to the embodiment.

FIG. 7 is a diagram illustrating an example of a hardware configuration of the user equipment according to the embodiment. FIG. 7 shows a configuration closer to an implementation example compared to FIG. 5. As illustrated in FIG. 7, the user equipment UE is provided with a RF module 401 that executes a process related to a radio signal; a BB processing module 402 that performs baseband signal processing; and a UE control module 403 that performs a process of a higher layer, etc.

The RF module 401 generates a radio signal to be transmitted from an antenna by applying a D/A conversion; modulation; a frequency conversion; power amplification, and so forth to a digital baseband signal received from the BB processing module 402. Additionally, a digital baseband signal is generated by applying a frequency conversion, an A/D conversion, demodulation, and so forth to a received radio signal; and it is passed to the BB processing module 402. The RF module 401 includes, for example, a part of the signal transmitter 101 and a part of the signal transmitter 201 and the signal receiver 202, which are illustrated in FIG. 5.

The BB processing module 402 executes a process of mutually converting an IP packet and a digital baseband signal. A DSP 412 is a processor that executes signal processing in the BB processing module 402. A memory 422 is used as a work area of the DSP 412. The BB processing module 402 includes, for example, a part of the signal transmitter 201, and a part of the signal receiver 202, which are illustrated in FIG. 5.

The UE control module 403 executes protocol processing of an IP layer, processing of various applications, and so forth. A processor 413 is the processor that executes a process to be executed by the UE control module 403. A memory 423 is used as a work area of the processor 413. The UE control module 403 includes, for example, a part of the signal transmitter 201, a part of the signal receiver 202, and the UE capability reporting unit 203, which are illustrated in FIG. 5.

<Processing Procedure>

Figure 8:
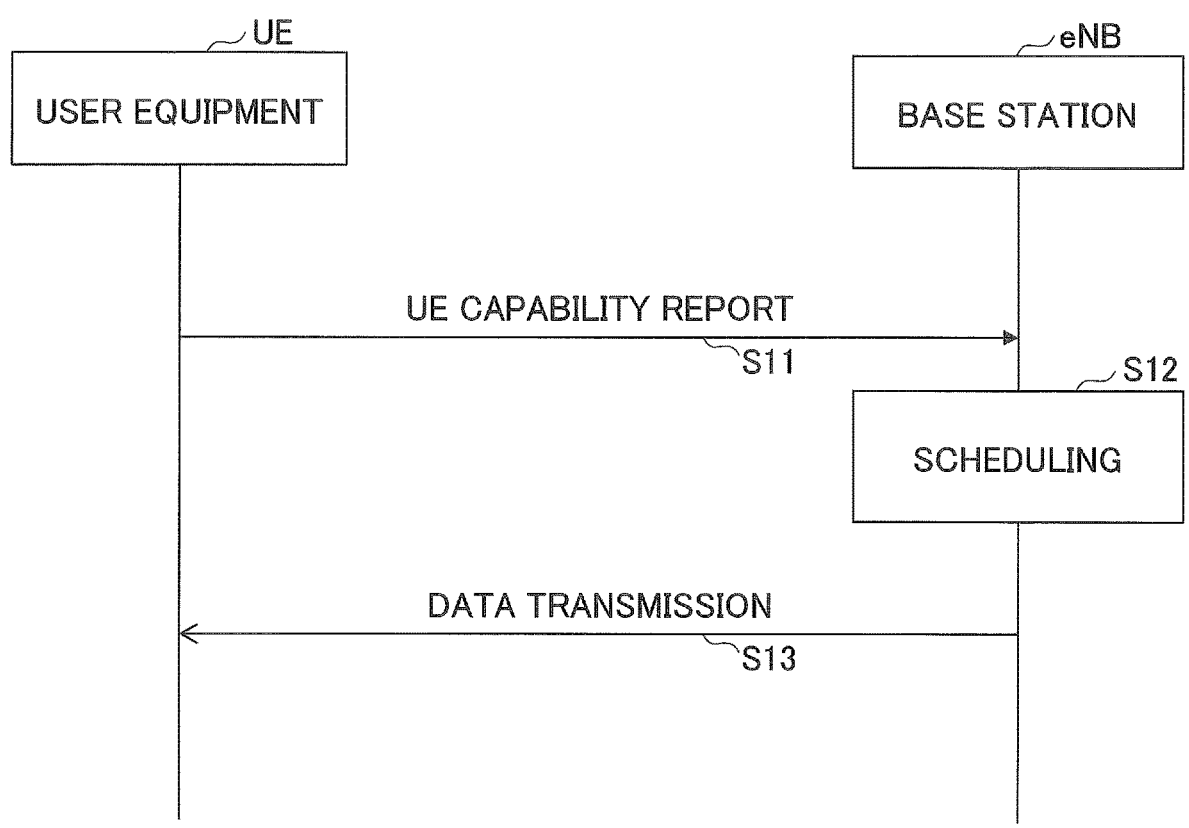
FIG. 8 is a sequence diagram illustrating a processing procedure to be performed by a radio communication system according to the embodiment.

FIG. 8 is a sequence diagram illustrating a processing procedure to be performed by the radio communication system according to the embodiment.

At step S11, the UE capability reporting unit 203 of the user equipment UE reports, to the base station eNB, a UE capability report message including its own UE capability (UE-EUTRA-Capability). The UE capability report message is, for example, "UECapabilityInformation" of the RRC message. More specifically, the UE capability reporting unit 203 reports, to the base station eNB, the UE category (which includes the UE DL category and the UE UL category) and the CA capability, as the UE capability. The CA capability includes band combinations supported by the user equipment UE itself; and the MIMO layer number and modulation schemes (e.g., 256 QAM) supported by the user equipment UE for each band combination and for each band, individually for UL/DL. The UE capability retrieval unit 103 stores the UE capability reported from the user equipment UE in a memory, etc.

At step S12, the scheduler 104 of the base station eNB allocates a radio resource to the user equipment UE. Here, when CA is to be performed, the scheduler 104 performs scheduling in a range that does not exceed the maximum bit rate specified for the UE category, based on the UE capability reported from the user equipment UE. For example, when the UE DL category of the user equipment UE is a specific category (the UE DL category 15 or 16), even if the maximum bit rate, which is available for transmission when the DL CCs are bundled, exceeds the upper limit of the maximum bit rate with the predetermined range specified in the standard specification as the maximum bit rate to be supported by the user equipment UE of the specific category, scheduling is performed so as not to exceed the upper limit of the maximum bit rate with the predetermined range specified in the standard specification.

As a specific example, a case is assumed in which the UE DL category of the user equipment UE is 15, and CA is performed with the combination of CCs (bands) of the CA pattern C shown in FIG. 2. In this case, a theoretical maximum bit rate for the CA pattern C is 841888 bits per 1 TTI. However, the maximum bit rate available for the user equipment UE for reception is from 749856 bits to 798800 bits per 1 TTI at maximum, as shown in FIG. 1. Consequently, the scheduler 104 of the base station eNB performs scheduling, so that it is less than or equal to 798800 bits per 1 TTI, which is the maximum value of the range from 749856 bits to 798800 bits.

At step S13, the base station eNB generates a TB from data to be transmitted to the user equipment UE; maps the generated TB onto a radio resource; and transmits the TB to the user equipment. The signal receiver 202 of the user equipment UE receives and decodes the transmitted TB to retrieve the data.

The processing procedure to be performed by the radio communication system according to the embodiment is described above. As described above, the signal receiver 202 of the user equipment UE is provided with the capability of receiving, upon detecting that a maximum bit rate that is achievable by carrier aggregation that is performed with a band combination, a MIMO layer number, and a modulation scheme that are supported by the user equipment UE itself exceeds an upper limit of a maximum bit rate with a predetermined range that is specified by the standard specification to be supported by the UE category of the user equipment UE, at the upper limit of the maximum bit rate with the predetermined range specified by the standard specification. Furthermore, the scheduler 104 of the base station eNB performs scheduling so as not to exceed the upper limit of the maximum bit rate with the predetermined range specified as the maximum bit rate to be supported by the UE category, which is supported by the user equipment UE. Consequently, even if the user equipment UE corresponds to a specific UE category (UE DL category 15 or 16), communication can be properly performed within a range of the capability of the user equipment UE.

Note that, an example of a change of the standard specification, which corresponds to the above-described embodiment, is shown in FIG. 9. The underlined part in FIG. 9 is the modified part corresponding to the embodiment.

Follow Sources

As described above, according to the embodiment, there is provided user equipment of a radio communication system provided with a base station and the user equipment, the user equipment including a reporting unit that reports, to the base station, a band combination supported by the user equipment, a MIMO layer number, and a modulation scheme, and a UE category supported by the user equipment; and a receiver that receives, upon detecting that a maximum bit rate that is achievable by carrier aggregation performed with the band combination supported by the user equipment, the MIMO layer number, and the modulation scheme that exceeds a maximum bit rate to be supported by the UE category supported by the user equipment, data from the base station with a bit rate that is less than or equal to the maximum bit rate to be supported by the user equipment under the UE category. With this user equipment UE, a technique is provided that is for allowing user equipment supporting a specific UE category to properly perform communication within the range of the capability of the user equipment.

Furthermore, according to the embodiment, there is provided a base station of a radio communication system provided with the base station and user equipment, the base station including a storage that stores, for each UE category of the user equipment, a maximum bit rate to be supported by the user equipment; a retrieval unit that retrieves the UE category of the user equipment; and a scheduler that performs, in response to detecting that a carrier aggregation is to be performed and that the retrieved UE category of the user equipment is a specific UE category, scheduling within a range that does not exceed the maximum bit rate to be supported by the user equipment under the specific UE category. With this base station eNB, a technique is provided that is for allowing user equipment supporting a specific UE category to properly perform communication within the range of the capability of the user equipment.

Furthermore, the scheduler may perform, upon detecting that the carrier aggregation is to be performed with a predetermined band combination, a predetermined MIMO layer number, and a predetermined modulation scheme, and that a maximum bit rate that is achievable by the carrier aggregation to be performed with the predetermined band combination, the predetermined MIMO layer number, and the predetermined modulation scheme exceeds an upper limit of a maximum bit rate with a predetermined range to be supported by the user equipment of the specific UE category, scheduling in a range that does not exceed the upper limit of the maximum bit rate with the predetermined range to be supported by the user equipment under the specific UE category. In this manner, it is possible to avoid scheduling being performed with a bit rate that exceeds the capability of the user equipment UE, and the throughput being decreased, as a consequence.

Furthermore, according to the embodiment, there is provided a communication method executed by user equipment of a radio communication system provided with a base station and the user equipment, the communication method including reporting, to the base station, a band combination supported by the user equipment, a MIMO layer number, and a modulation scheme, and a UE category supported by the user equipment; and receiving, upon detecting that a maximum bit rate that is achievable by a carrier aggregation performed with the band combination supported by the user equipment, the MIMO layer number, and the modulation scheme exceeds a maximum bit rate to be supported by the UE category supported by the user equipment, data from the base station with a bit rate that is less than or equal to the maximum bit rate to be supported by the user equipment under the UE category. With this communication method, a technique is provided that is for allowing user equipment supporting a specific UE category to properly perform communication within the range of the capability of the user equipment.

<Supplement to the Embodiment>

The configuration of each device (the user equipment UE/the base station eNB) described in the embodiment of the present invention may be a configuration that is implemented by executing a program by a CPU (processor) in the device including the CPU and a memory; may be a configuration that is implemented by hardware provided with a logic for the process described in the embodiment, such as a hardware circuit; or may be a mixture of programs and hardware.

Notification of information is not limited the aspect/embodiment described in the present specification and may be performed by other methods. For example, notification of information may be performed via physical layer signaling (for example, Downlink Control Information (DCI) or Uplink Control Information (UCI)), upper-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Furthermore, each aspect/embodiment described in this specification can be applied to long term evolution (LTE), LTE-advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wideband (UWB), Bluetooth (registered trademark), any other systems using an appropriate system and/or next generation systems expanded on the basis of these systems.

Determination or decision may be made by a value (0 or 1) represented by one bit, may be made by a Boolean value (Boolean: true or false), and may be made by comparison of numerical values (comparison with a predetermined value, for example).

Note that the terms described in this specification and/or the terms necessary for understanding of this specification may be replaced with terms having the same or similar meaning. For example, the channel and/or symbol may be signaling (signal). Furthermore, a signal may be a message.

The UE may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The terms "determining" and "deciding" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

In addition, processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

Input and output Information and the like may be stored in a specific location (for example, a memory) and may be managed by a management table. The input and output information and the like may be overwritten, updated, or rewritten. The output information and the like may be erased. The input information and the like may be transmitted to other apparatuses.

Notification of predetermined information (e.g., notification of "being X") is not limited to notification that is made explicitly, and the notification may be made implicitly (e.g., notification of the predetermined information is not performed).

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

The embodiment of the present invention is described above; however the disclosed invention is not limited to the embodiment, and a person ordinarily skilled in the art will appreciate various variations, modifications, alternatives, replacements, and so forth. Specific examples of numerical values are used in the description in order to facilitate understanding of the invention. However, these numerical values are merely an example, and any other appropriate values may be used, except as indicated otherwise. The separations of the items in the above description are not essential to the present invention. Depending on necessity, subject matter described in two or more items may be combined and used, and subject matter described in an item may be applied to subject matter described in another item (provided that they do not contradict). A boundary of a functional unit or a processor in the functional block diagrams may not necessarily correspond to a boundary of a physical component. An operation by a plurality of functional units may be physically executed by a single component, or an operation of a single functional unit may be physically executed by a plurality of components. The order of each of the sequences and flow charts described in the embodiment may be re-arranged, provided that they do not contradict. For the convenience of description, the user equipment UE/the base station eNB are described by using the functional block diagrams; however, such devices may be implemented in hardware, software, or combinations thereof. The software to be executed by the processor included in the UE in accordance with the embodiment of the present invention and the software to be executed by the processor included in the base station eNB may be stored in any appropriate storage medium, such as a random access memory (RAM), a flash memory, a read-only memory (ROM), an EPROM, an EEPROM, a register, a hard disk drive (HDD), a removable disk, a CD-ROM, a database, a server, and so forth.

This international patent application is based upon and claims the benefit of priority of Japanese Patent Application No. 2016-026393 filed on Feb. 15, 2016, and the entire contents of Japanese Patent Application No. 2016-026393 are incorporated herein by reference.

LIST OF REFERENCE SYMBOLS

UE: user equipment
eNB: base station
101: signal transmitter
102: signal receiver
103: UE capability retrieval unit
104: scheduler
105: storage unit
201: signal transmitter
202: signal receiver
203: UE capability reporting unit
301: RF module
302: BB processing module
303: device control module
304: communication IF
401: RF module
402: BB processing module
403: UE control module

The invention claimed is:

1. User equipment of a radio communication system provided with a base station and the user equipment, the user equipment comprising:
a reporting unit that reports, to the base station, a band combination supported by the user equipment, a MIMO layer number, and a modulation scheme, and a UE category supported by the user equipment;
a receiver that receives, upon detecting that a maximum number of bits within one transmission time interval (TTI) that is achievable by carrier aggregation performed with the band combination supported by the user equipment, the MIMO layer number, and the modulation scheme exceeds a maximum number of bits within one TTI to be supported by the UE category supported by the user equipment, a transport block from the base station with a number of bits within one TTI that is less than or equal to the maximum number of bits within one TTI to be supported by the user equipment under the UE category; and
a decoder that decodes, when the transport block is decoded, the transport block based on a number of bits within one TTI that is reduced compared with the maximum number of bits within one TTI that is achievable with the band combination, the MIMO layer number, and the modulation scheme reported to the base station,
wherein the UE category supported by the user equipment includes at least one of DL Category 15 and DL Category 16, and
wherein the maximum number of bits within the one TTI to be supported by the user equipment under the DL Category 15 is 798,800 bits, and the maximum number of bits within the one TTI to be supported by the user equipment under the DL Category 16 is 1,051,360 bits.

2. A base station of a radio communication system provided with the base station and user equipment, the base station comprising:
a storage that stores, for each UE category of the user equipment, a maximum number of bits within one transmission time interval (TTI) to be supported by the user equipment;
a retrieval unit that retrieves UE capability of the user equipment; and a scheduler that performs, in response to detecting that a carrier aggregation is to be performed and that a UE category included in the retrieved UE capability of the user equipment is a specific UE category, scheduling within a range that does not exceed the maximum number of bits within one TTI to be supported by the user equipment under the specific UE category, wherein, when a carrier aggregation is performed with a predetermined band combination, a predetermined MIMO layer number, and a predetermined modulation scheme included in the UE capability retrieved from the user equipment, and upon detecting that a maximum number of bits within one TTI that is achievable by the carrier aggregation performed with the predetermined band combination, the predetermined MIMO layer number, and the predetermined modulation scheme exceeds an upper limit of the maximum number of bits within one TTI with a predetermined range that is to be supported by the user equipment under the specific UE category, the scheduler performs scheduling within a range that does not exceed the upper limit of the maximum number of bits within one TTI with the predetermined range that is to be supported by the user equipment under the specific UE category, wherein the specific UE category includes at least one of DL Category 15 and DL Category 16, and wherein the upper limit of the maximum number of bits within the one TTI with the predetermined range that is to be supported by the user equipment under the DL Category 15 is 798,800 bits, and the upper limit of the maximum number of bits within the one TTI with the predetermined range that is to be supported by the user equipment under the DL Category 16 is 1,051,360 bits.

3. A communication method executed by user equipment of a radio communication system provided with a base station and the user equipment, the communication method comprising:

reporting, to the base station, a band combination supported by the user equipment, a MIMO layer number, and a modulation scheme, and a UE category supported by the user equipment; and upon detecting that a maximum number of bits within one transmission time interval (TTI) that is achievable by a carrier aggregation performed with the band combination supported by the user equipment, the MIMO layer number, and the modulation scheme exceeds a maximum number of bits within one TTI to be supported by the UE category supported by the user equipment, receiving, from the base station, a transport block with a number of bits within one TTI that is less than or equal to the maximum number of bits within one TTI to be supported by the user equipment under the UE category; and when the transport block is decoded, decoding the transport block based on a number of bits within one TTI that is reduced compared with the maximum number of bits within one TTI that is achievable with the band combination, the MIMO layer number, and the modulation scheme that are reported to the base station, wherein the UE category supported by the user equipment includes at least one of DL Category 15 and DL Category 16, and wherein the maximum number of bits within the one TTI to be supported by the user equipment under the DL Category 15 is 798,800 bits, and the maximum number of bits within the one TTI to be supported by the user equipment under the DL Category 16 is 1,051,360 bits.

* * * * *